United States Patent
Miyazaki et al.

(10) Patent No.: US 8,909,001 B2
(45) Date of Patent: Dec. 9, 2014

(54) OPTICAL MODULATOR

(71) Applicant: Sumitomo Osaka Cement Co., Ltd., Chiyoda-Ku, Tokyo (JP)

(72) Inventors: Norikazu Miyazaki, Tokyo (JP); Motohiro Takemura, Tokyo (JP); Youichi Hosokawa, Tokyo (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 14/037,105

(22) Filed: Sep. 25, 2013

(65) Prior Publication Data

US 2014/0093202 A1   Apr. 3, 2014

(30) Foreign Application Priority Data

Sep. 28, 2012   (JP) .................................. 2012-218762

(51) Int. Cl.
*G02F 1/035*   (2006.01)
*G02F 1/01*   (2006.01)
*G02F 1/225*   (2006.01)

(52) U.S. Cl.
CPC ................ *G02F 1/011* (2013.01); *G02F 1/035* (2013.01); *G02F 1/225* (2013.01)
USPC .................................................. 385/3; 385/2

(58) Field of Classification Search
USPC .......................................................... 385/2, 3
See application file for complete search history.

(56) References Cited

U.S. PATENT DOCUMENTS

| 7,689,066 | B2 * | 3/2010 | Kondo et al. ..................... 385/3 |
| 2009/0154867 | A1 * | 6/2009 | Iwata et al. ....................... 385/2 |
| 2010/0316343 | A1 * | 12/2010 | Yamamoto ..................... 385/129 |
| 2012/0106888 | A1 * | 5/2012 | Goh et al. ......................... 385/3 |

FOREIGN PATENT DOCUMENTS

JP   2011-34057 A   2/2011
WO   2011/004615 A1   1/2011

\* cited by examiner

*Primary Examiner* — Jerry Blevins
(74) *Attorney, Agent, or Firm* — Taft Stettinius & Hollister LLP

(57) ABSTRACT

An optical modulator comprises a substrate 4 having a thickness of 20 μm or less and an electro-optic effect, a reinforcing substrate 6 holding the substrate 4 thereon and a resin layer 5 disposed between the substrate and the reinforcing substrate, in which the substrate 4 includes optical waveguides 1 and 2 and control electrodes 3 and 31 which control light waves propagating through the optical waveguide, in which the optical waveguides include at least two optical waveguides 1 separated from each other, and in which the control electrodes 31 disposed between the two optical waveguides are configured to include two electrodes 31 disposed along each optical waveguide, and a thin line 8 conducting the two electrodes 31 at a same potential.

3 Claims, 3 Drawing Sheets

FIVE TIMES

TEN TIMES

12 TIMES

15 TIMES

OPTICAL MODULATOR

BACKGROUND OF THE INVENTION

1. Field of the Invention

Priority is hereby claimed to Japan Patent Application No. 2012-218762 filed on Sep. 28, 2012, and such priority application is hereby incorporated by reference herein, in its entirety. The present invention relates to an optical modulator, in particular, relates to the optical modulator comprising a substrate having a thickness of 20 μm or less and an electric-optic effect, a reinforcing substrate holding the substrate thereon, and a resin layer disposed between the substrate and the reinforcing substrate.

2. Description of Related Art

An electro-optic crystal such as lithium niobate (LN) is used and a travelling-wave type modulator in which an optical waveguide with a Mach-Zehnder (MZ) structure is formed on the crystal substrate is widely used for optical modulation in a technical field of an optical communication or an optical measurement.

In a case where a substrate constituting an optical modulator is thinned to approximately 20 μm, it is possible to achieve velocity matching of light waves propagating through an optical waveguide and modulation signals propagating through a control electrode without forming a buffer layer formed of $SiO_2$ and the like between a substrate on which an optical waveguide is formed and a control electrode. Thus, it is possible to obtain an optical modulator in which drive voltages are reduced.

On the other hand, an optical modulator in which a plurality of MZ structures are integrated is also used in order to deal with various modulation formats. For example, as disclosed in International Publication No. WO2011/004615 or Japanese Laid-open Patent Publication No. 2011-034057, an optical modulator having an insert die-type optical waveguide in which a sub-Mach-Zehnder type optical waveguide is incorporated into two branch waveguides of a main Mach-Zehnder type optical waveguide, so-called, a nest-type optical waveguide is also used. The nest-type optical modulator particularly receives attention as an optical modulator which is capable of performing a high-speed operation such as a DP-QPSK modulator.

A gap between the two branch waveguides in the main Mach-Zehnder structure is as wide as approximately 100 μm to 500 μm in such a nest-type optical modulator into which the MZ structures are integrated.

As illustrated in FIGS. 1A and 1B, a sub-Mach-Zehnder type optical waveguide 2 is formed in each branch waveguide 1 of the main Mach-Zehnder type optical waveguide.

Reference numerals 3 and 30 of FIG. 1A are control electrodes which control a phase of an optical wave propagating through a branch waveguide 1 by applying a predetermined electric field to the branch waveguide 1. DC bias voltages are applied to the control electrodes 3 and 30 in order to hold the optical waves propagating through each branch waveguide in a predetermined phase difference. FIG. 1B is a cross-sectional view taken along an alternate long and short dash line A-A of FIG. 1A. In FIGS. 1A and 1B, an X-cut-type substrate is used as a substrate 4; however, even in a case where a Z-cut substrate is used, there is a case where a control electrode 30 straddling over the two branch waveguides 1 is formed.

The control electrode is formed to straddle over the branch waveguides and has a width of several hundreds of μm in the same manner as the gap between the branch waveguides. However, as illustrated in FIG. 1B, if the width of the control electrode disposed between the branch waveguides 1 becomes larger, since the width of the control electrode 30 is larger in comparison with the thickness of the substrate 4, an electric field distribution 7 generated between the control electrodes is widened. As a result, the electric field is distributed to the outside of the substrate 4.

As illustrated in FIG. 1B, in a case where the substrate 4 becomes thinner, a reinforcing substrate 6 is bonded via a resin layer 5 such as an adhesive in order to reinforce the substrate 4. The electric field distribution 7 extends to a range of the resin layer 5. In a case where high-frequency modulation signals are applied to the control electrode, since the electric field distribution formed by the modulation signals is limited to a vicinity of the electrode, the electric field distribution does not penetrate into the resin layer 5, unlike as illustrated in FIG. 1B. However, in a case where DC voltages such as DC bias voltages are applied to the control electrode, as illustrated in FIG. 1B, the electric field is distributed to the outside of the thin substrate 4.

In a case where an electric field is distributed to the resin layer, a modulation curve of the optical modulator is easily shifted, so-called, a drift phenomenon becomes significant as compared with a case where an electric field is not widely distributed to the inside of the resin by characteristic changes due to mobile ions in the resin or alternation and degradation of the resin layer. If the DC bias voltages to be applied are increased in order to control bias points of the modulation curve, the electric field further penetrates into the resin layer 5. Therefore, characteristic degradation of the optical modulator is more accelerated.

On the other hand, it is possible to configure the control electrode 30 after a shape of the branch waveguide 1 is changed and the gap between the branch waveguides is narrowed. However, in this case, a conversion unit for changing the gap between the waveguides is necessary, and as a result, element length is increased.

SUMMARY OF THE INVENTION

The present invention is made to solve the above-explained problems and an object thereof is to provide an optical modulator which can suppress degradation of modulation characteristics such as a drift characteristic of a bias point of the optical modulator in the optical modulator in which a thin substrate having a thickness of 20 μm or less is used, even in a case where it is necessary to increase a width of a control electrode due to widening of a gap between optical waveguides.

An optical modulator of the present invention has technical characteristics as follows in order to solve the above-described problems.

(1) An optical modulator comprises a substrate having a thickness of 20 μm or less and an electro-optic effect; a reinforcing substrate holding the substrate thereon; and a resin layer disposed between the substrate and the reinforcing substrate, in which an optical waveguide and a control electrode which controls light waves propagating through the optical waveguide are formed on the substrate, in which the optical waveguide includes at least two optical waveguides separated from each other, and in which the control electrode disposed between the two optical waveguides is configured to include two electrodes disposed along each optical waveguide and a thin line conducting the two electrodes at a same potential.

(2) In the optical modulator of according to (1), a width of each of the two electrodes is ten times or less of a thickness of the substrate.

(3) In the optical modulator according to (1) or (2), the control electrode disposed between the two optical waveguides is an electrode into which a DC bias voltage is applied.

(4) In the optical modulator according to (1) or (2), the optical waveguide formed on the substrate is a nest-type optical waveguide, and the two optical waveguides are two branch waveguides of a main Mach-Zehnder type optical waveguide constituting the nest-type optical waveguide.

As in the present invention, since an optical modulator comprises a substrate having a thickness of 20 μm or less and an electro-optic effect, a reinforcing substrate holding the substrate thereon and a resin layer disposed between the substrate and the reinforcing substrate, in which an optical waveguide and a control electrode which controls light waves propagating through the optical waveguide are formed on the substrate, in which the optical waveguide includes at least two optical waveguides separated from each other, and in which the control electrode disposed between the two optical waveguides is configured to include two electrodes disposed along each optical waveguide and a thin line conducting the two electrodes at a same potential, it is possible to narrow a width of the control electrode along the optical waveguide. For this reason, it is possible for an electric field distribution formed by the control electrode to remain in the substrate, and it is possible to suppress degradation of modulation characteristics such as a drift characteristic of a bias point or the like by suppressing alteration and degradation of the resin layer.

DETAILED DESCRIPTION OF THE INVENTION

Hereinafter, description will be given with regard to the present invention in detail using suitable examples.

Figure 2A:
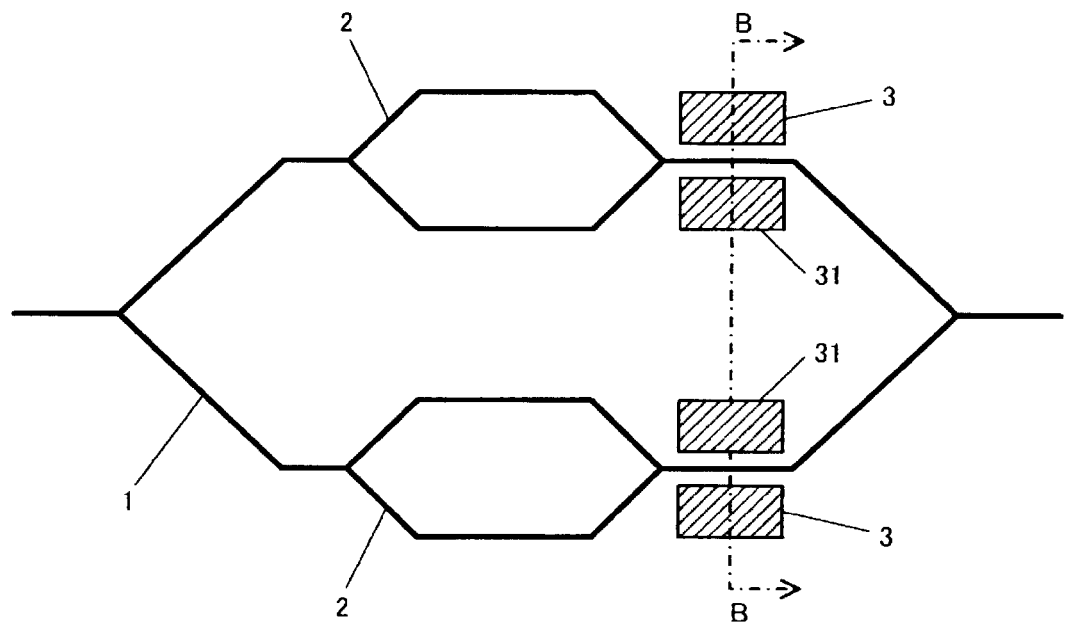
FIGS. 2A and 2B are diagrams illustrating an outline of an optical modulator of the present invention.
Figure 2B:
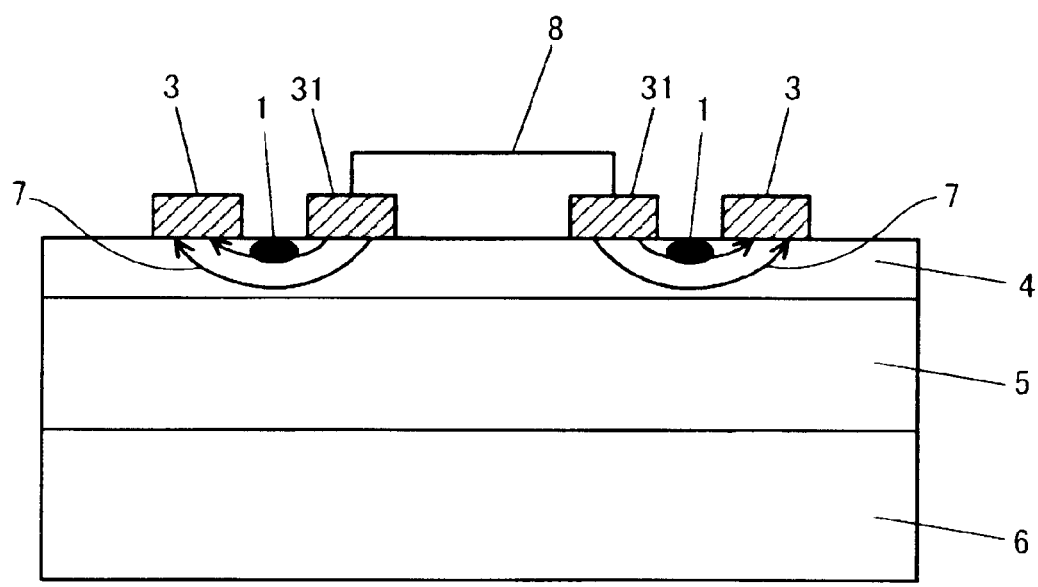

As illustrated in FIGS. 2A and 2B, an optical modulator of the present invention comprises a substrate 4 having a thickness of 20 μm or less and an electro-optic effect, a reinforcing substrate 6 holding the substrate 4 thereon and a resin layer 5 disposed between the substrate and the reinforcing substrate, in which the substrate 4 includes optical waveguides 1 and 2 and control electrodes 3 and 31 which control light waves propagating through the optical waveguide, in which the optical waveguides include at least two optical waveguides 1 separated from each other, and in which the control electrodes 31 disposed between the two optical waveguides are configured to include two electrodes 31 disposed along each optical waveguide, and a thin line 8 conducting the two electrodes 31 at a same potential.

As a substrate having an electro-optical effect used in the optical modulator of the present invention, various known materials can be used and a single crystal material such as lithium niobate, lithium tantalate and lead lanthanum zirconate titanate (PLZT), and the like or a solid solution crystal material of these materials can also be used.

It is possible to form an optical waveguide on a substrate by thermal diffusion after depositing titanium or the like on a substrate, for example. In addition, it is possible to form a ridge-type or rib-type optical waveguide by forming unevenness on the substrate. The electrode is formed in the vicinity of the optical waveguide in such a case where the electrode is formed directly above the optical waveguide using a Z-cut substrate, for example, it is possible to form a buffer layer made of oxide silicon ($SiO_2$) on the optical waveguide or on the substrate in order to suppress absorption into an electrode layer of light waves propagating through the optical waveguide.

The control electrode is formed of conductive metal such as gold and the like. The control electrode is usually configured to have a signal electrode and a ground electrode. A control electrode (not illustrated) for performing high-frequency modulation is disposed in a sub-Mach-Zehnder type optical waveguide 2 of FIG. 2A and the control electrodes (3 and 31) and the like for phase adjustment are disposed along a main Mach-Zehnder type optical waveguide 1.

In a case where a thickness of the substrate is 20 μm or less, since mechanical strength of the substrate is reduced, the reinforcing substrate 6 is bonded via the resin layer 5 such as an adhesive. As a material of the reinforcing substrate, a material having the same characteristic as the substrate can be also used in order to match a thermal expansion coefficient to the substrate.

Figure 1A:
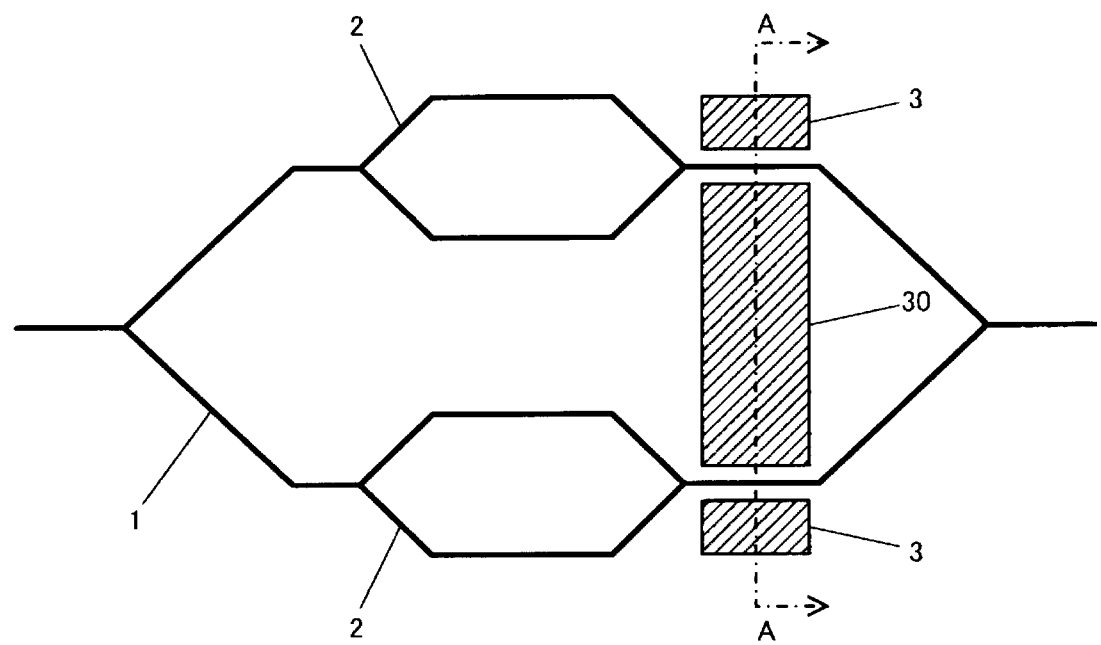
FIGS. 1A and 1B are diagrams illustrating an outline of a conventional optical modulator.
Figure 1B:
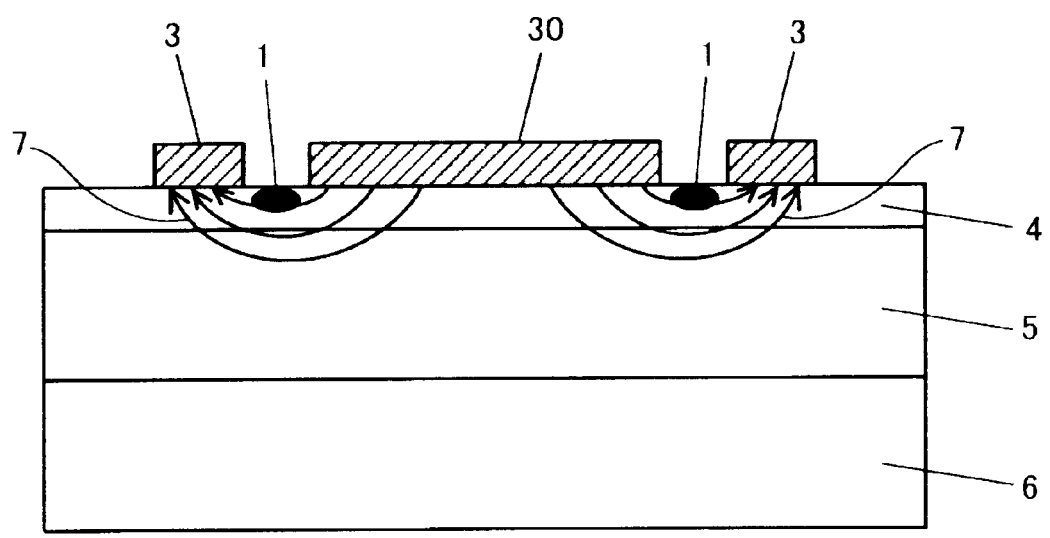

The optical modulator of the present invention, as illustrated in FIGS. 1A and 1B, in a case where a gap between the optical waveguides 1 is widened and the width of the control electrode disposed between the optical waveguides is also widened, as illustrated in FIGS. 2A and 2B, a control electrode disposed between the optical waveguides is divided. Then, penetration of an electric field 7 formed by the control electrode into the resin layer 5 is suppressed by narrowing the width of one control electrode 31.

In this manner, alteration and degradation of the resin layer 5 are suppressed by suppressing extension of an electric field distribution, and as a result, a drift characteristic of the optical modulator can be improved. In addition, strength of the electric field applied to the optical waveguide 1 is controlled by the gap between the electrodes (3 and 31) on both sides of the waveguides 1 and affects driving voltages of the optical modulator. However, since the present invention can be achieved without changing the gap between the electrodes (3 and 31), therefore it is possible to prevent operating voltages from increasing as compared with the conventional structure.

When the gap between the two optical waveguides 1 becomes wider as compared to the thickness of the substrate 4, configuration of the control electrode as illustrated in FIGS. 2A and 2B is particularly necessary. However, it is preferable that the width of each control electrode in that case is 10 times or less of the thickness of the substrate.

Figure 4:
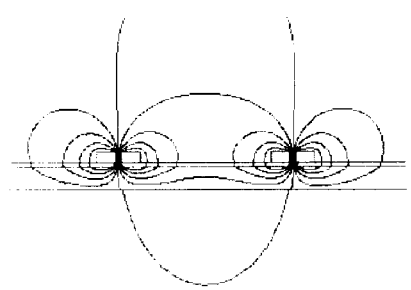
FIG. 4 is a diagram illustrating a distribution state of an equipotential line in a case where a width of a control electrode is changed.
Figure 4:
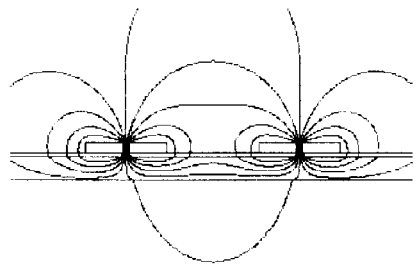
Figure 4:
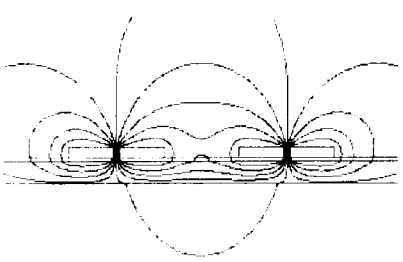
Figure 4:
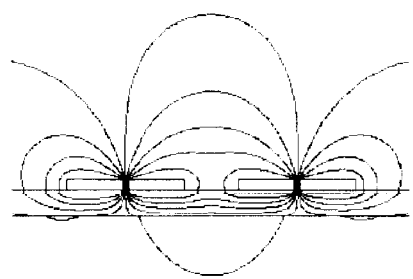

FIG. 4 is a diagram illustrating a distribution of the equipotential line, which is made by the control electrode, in a case where the width of the control electrode is changed to five times, ten times, 12 times, and 15 times the thickness of the substrate. The thickness of the substrate is 9 μm, and 8V voltages are applied between the ground electrode and the signal electrode constituting the control electrode. Therefore, a potential difference between the equipotential lines adjacent in the diagram is 0.8V. In each drawing, the control electrode, the substrate, the resin layer, and the reinforcing substrate are sequentially formed in this order from the top.

Referring to FIG. 4, if the width of the control electrode becomes 12 times or more the thickness of the substrate, four or more equipotential lines are present over the entire resin layer. Therefore, it is possible to easily understand that a strong electric field constantly acts. Also from this, it can be said that the width of the control electrode is preferably 10 times or less the thickness of the substrate.

Figure 3:
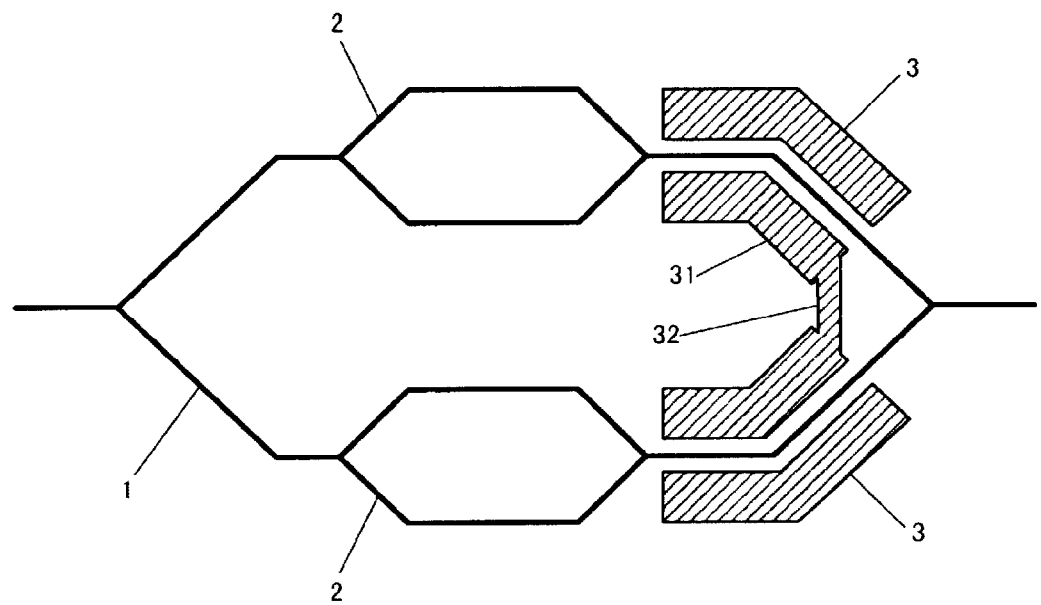
FIG. 3 is a diagram illustrating another embodiment of the optical modulator of the present invention.

A thin line 8 for maintaining the same potential is connected to the control electrodes 31 which are divided. Any shape can be adapted to the thin line if the thin line has a shape to prevent the electric field formed by the thin line from penetrating into the resin layer. For example, the thin line may be a conduction line 32 made by the same formation process as the control electrode as illustrated in FIG. 3.

In fact, a Mach-Zehnder (MZ) structure having 200-µm waveguide gap and 10-µm substrate thickness is configured using an LN substrate. The substrate on which the waveguide is formed is bonded to the reinforcing substrate using an optical resin having a dielectric constant lower than that of the substrate. The electrode width on both sides of the waveguide is set to 50 µm. A drift amount, in which temperature acceleration is performed, is measured for 24 hours by applying a bias DC to the structure. As a result, it is possible to confirm that the drift amount was reduced as compared with the conventional example in which an electrode having a width substantially the same as the waveguide gap is used.

The optical modulator of the present invention shows an excellent effect in a case where the control electrode disposed between the two optical waveguides is an electrode into which a DC bias is applied. In addition, one side of the electrodes 3 and 31 of FIGS. 2A and 2B may be used as a signal electrode giving a potential and the other side of the electrodes may be used as a ground electrode. In addition, the electrodes may have push-pull operation-type electrode configurations in which DC power sources with different potentials are connected to respective electrodes. In addition, a buffer layer in order to reduce the loss of light by the electrode or the adhesive layer may be formed on the top or the bottom of the waveguide substrate.

In addition, as illustrated in FIG. 2A, it is possible to set the optical waveguide formed on the substrate as a nest-type optical waveguide and to adapt the configuration of the present invention to the control electrode between the two branch waveguides 1 of a main Mach-Zehnder type optical waveguide constituting the nest-type optical waveguide in the optical modulator of the present invention. As a result, it is possible to apply the present invention also to an optical modulator such as a DP-QPSK modulator.

Furthermore, as illustrated in FIG. 3, it is possible to increase an interaction length even in some regions of bending of a Y branch waveguide by forming the electrodes 3 and 31 along the waveguide. Reference numeral 32 is a thin line that connects the control electrodes which are divided.

According to the present invention, it is possible to provide an optical modulator which can suppress degradation of modulation characteristics such as a drift characteristic of a bias point of the optical modulator in which a thin substrate having a thickness of 20 µm or less is used, even in a case where it is necessary to increase a width of a control electrode due to widening of a gap between optical waveguides.

The invention claimed is:

1. An optical modulator comprising:
   a substrate having a thickness of 20 µM or less and an electro-optic effect;
   a reinforcing substrate holding the substrate thereon; and
   a resin layer disposed between the substrate and the reinforcing substrate,
   wherein an optical waveguide and a control electrode which controls light waves propagating through the optical waveguide are formed on the substrate,
   wherein the optical waveguide includes at least two optical waveguides separated from each other,
   wherein the control electrode disposed between the two optical waveguides is configured to include two electrodes, each one of said two electrodes being disposed along one of the two optical waveguides, and a thin line conducting the two electrodes at a same potential,
   wherein a width of each of the two electrodes disposed along the optical waveguides is ten times or less of a thickness of the substrate, and
   wherein no control electrode is disposed between the two electrodes disposed along the optical waveguides.

2. The optical modulator according to claim 1, wherein the control electrode disposed between the two optical waveguides is an electrode into which a DC bias voltage is applied.

3. The optical modulator according to claim 1, wherein the optical waveguide formed on the substrate is a nest-type optical waveguide and the two optical waveguides are two branch waveguides of a main Mach-Zehnder type optical waveguide constituting the nest-type optical waveguide.

* * * * *